United States Patent [19]

Baker et al.

[11] Patent Number: 5,025,271
[45] Date of Patent: Jun. 18, 1991

[54] THIN FILM RESISTOR TYPE THERMAL INK PEN USING A FORM STORAGE INK SUPPLY

[75] Inventors: Jeffrey P. Baker; Duong T. La, both of San Diego; Randy A. Coverstone, Newark, all of Calif.

[73] Assignee: Hewlett-Packard Company, Palo Alto, Calif.

[21] Appl. No.: 409,486

[22] Filed: Sep. 18, 1989

Related U.S. Application Data

[60] Continuation of Ser. No. 191,292, May 6, 1988, abandoned, which is a division of Ser. No. 880,774, Jul. 1, 1986, Pat. No. 4,771,295.

[51] Int. Cl.⁵ .............................. B41J 2/05; B41J 2/21
[52] U.S. Cl. .............................................. 346/140 R
[58] Field of Search ........................ 346/140; 401/223

[56] References Cited

U.S. PATENT DOCUMENTS

| | | | |
|---|---|---|---|
| 3,441,950 | 4/1969 | Miller | 346/140 R |
| 4,095,237 | 6/1987 | Amberntsson | 346/140 |
| 4,306,245 | 12/1981 | Kasugayama | 346/140 |
| 4,329,698 | 5/1982 | Smith | 346/140 |
| 4,368,478 | 1/1983 | Koto | 346/140 |
| 4,415,909 | 11/1983 | Italiano | 346/140 R |
| 4,436,439 | 3/1984 | Koto | 346/140 X |
| 4,500,895 | 2/1985 | Buck | 346/140 |
| 4,511,906 | 4/1985 | Hara | 346/140 R |
| 4,611,219 | 9/1986 | Sugitani | 346/140 |
| 4,630,076 | 12/1986 | Yoshimura | 346/140 |
| 4,630,758 | 12/1986 | Mutoh | 346/140 X |
| 4,633,274 | 12/1986 | Matsuda | 346/140 |
| 4,683,481 | 7/1987 | Johnson | 346/140 |
| 4,712,172 | 12/1987 | Kiyohara | 346/140 X |
| 4,734,717 | 3/1988 | Rayfield | 346/140 |
| 4,746,935 | 5/1988 | Allen | 346/140 |
| 4,771,295 | 9/1988 | Baker | 346/140 |
| 4,914,736 | 4/1990 | Matsuda | 346/140 |

Primary Examiner—Joseph W. Hartary

[57] ABSTRACT

A disposable thin film resistor type thermal ink jet pen including a housing having a support surface at one end thereof with openings for passing ink to an adjacent thin film resistor type thermal ink jet printhead. The printhead is mounted on the support surface and has ink ejection orifii therein communicating with openings in the support surface. A porous foam material is mounted within the housing and is operative to receive and retain a supply of ink for feeding the ink by capillary action through the openings in the support surface and to the ink jet printhead. The foam ink storage material is compressed in one or more compartments of the housing to reduce the pore size therein and reduce the foam thickness while increasing its density. By this process, the capillary force of the foam is increased and thereby renders this ink storage medium especially well-suited for feeding ink on demand to a thin film resistor type of thermal ink jet printhead.

3 Claims, 2 Drawing Sheets

THIN FILM RESISTOR TYPE THERMAL INK PEN USING A FORM STORAGE INK SUPPLY

CROSS REFERENCE TO RELATED APPLICATION

This application is a continuation of application Ser. No. 07/191,292, filed May 6, 1988, now abandoned which is a divisional of application Ser. No. 880,774, filed July 1, 1986, now U.S. Pat. No. 4,771,295.

TECHNICAL FIELD

This invention relates generally to thermal ink jet pen construction and more particularly to a single or multi-compartment pen body having improved ink storage and distribution capabilities.

RELATED APPLICATION BACKGROUND ART

In the art of thermal ink jet printing, it is known to provide a bladder type of ink reservoir for supplying ink to a thermal ink jet printhead. The printhead will typically include a thin film resistor (TFR) substrate having a plurality of heater resistors therein, and a barrier layer and orifice plate member is usually mounted on top of the thin film resistor substrate. This member will typically include the ink reservoirs which are disposed above the heater resistors and further defines the corresponding drop generator nozzles for ejecting ink onto a print medium.

The bladder reservoir for supplying ink to the entire printhead may, for example, take the form of a rubber thimble which is located within the housing to which the thermal ink jet printhead is affixed. This type of reservoir and printhead construction is disclosed, for example, in the *Hewlett Packard Journal*, Volume 36, Number 5, May 1985, incorporated herein by reference.

Whereas these bladder type reservoirs have proven generally satisfactory for certain types of thermal ink jet (TIJ) printers, they nevertheless take up too much space and are unable to hold a sufficiently large volume of ink for other types of printer applications.

DISCLOSURE OF INVENTION

Accordingly, the general purpose of this invention is to provide new and improved pen body construction adapted for use in thermal ink jet printers. This new pen body construction represents a significant departure from the bladder-type ink storage approach and includes a novel printhead and ink storage structural arrangement. In this arrangement, the above problems associated with the ink storage and ink delivery mechanisms of the prior art have been either eliminated or substantially minimized.

To accomplish this purpose, we have discovered and developed a novel pen body construction which includes a certain ink storage foam which is preferably a controlled porosity polyurethane foam. This foam has been reticulated to break the walls of small membranes within the foam material and thereby increase the mobility of ink flow therein. The foam is also compressed to reduce the pore size therein to in turn reduce the foam thickness while increasing its density. In this manner, the desired capillarity of the foam can be controlled. By this process, the capillary force of the foam is increased and thereby renders this ink storage medium especially well suited for feeding ink to a thin film resistor type of thermal ink jet printhead. Furthermore, this ink feed apparatus is provided using a minimum of space (volume) to house the foam, and it features a corresponding maximum of ink storage capability in the foam. In addition, this polyurethane foam is economical to provide and is particularly adaptable for insertion into separate adjacent compartments of a pen body housing. This housing may then be used to store ink in various colors, such as cyan, magenta, and yellow, in a disposable pen body according to one embodiment of the invention.

A novel feature of this invention is the provision of an ink jet pen having a plurality of ink compartments therein for storing different colors in ink, and the pen also includes a thin film printhead mounted adjacent to the compartments and having an orifice plate with a plurality of orifice groups therein. Each of the orifice groups communicates with a separate ink flow passage in the printhead, and all of the ink flow passages are fluidically isolated one from another. Also, the orifice groups are symmetrically spaced with respect to the ink flow passages, and a plurality of ink pipes serve to interconnect each of the ink passages, respectively, to each of the separate ink compartments.

The various advantages and novel features of this pen body construction will become more readily apparent in the following description of the accompanying drawing.

BEST MODE FOR CARRYING OUT THE INVENTION

Figure 1:
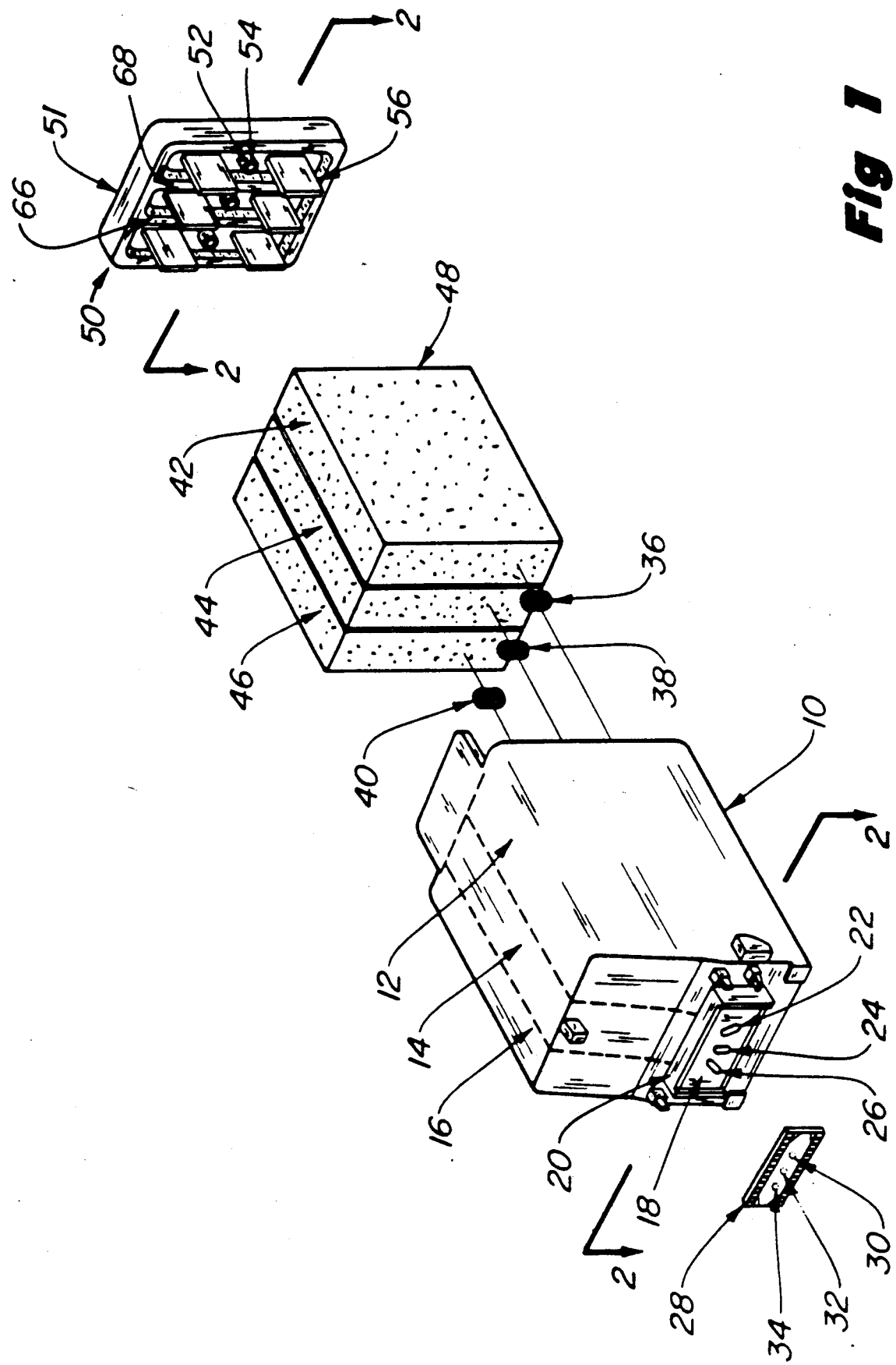
FIG. 1 is an exploded view of the pen body construction according to one embodiment of the invention.

Referring now to FIG. 1, there is shown a three compartment pen body designated generally as 10 and having three (3) ink storage compartments 12, 14 and 16 therein as indicated by the dashed line divider partitions within the interior of the body 10. The pen body 10 further includes an output printhead support surface 18 which is joined to upstanding side walls 20 in a rectangular receptacle configuration. This structure further includes three (3) ink output ports 22, 24 and 26 respectively communicating with the three ink storage compartments 12, 14 and 16.

The rectangular support receptacle 18 is configured to receive a thin film resistor type printhead 28 having a plurality of ink ejection orifice groups 30, 32 and 34 respectively which are circular in geometry and which communicate with the ink flow passages 22, 24 and 26 extending to the surface 18 of the rectangular support receptacle.

In the assembly of FIG. 1, three ink filters 36, 38 and 40 are mounted within the compartments 12, 14 and 16, respectively. These filters are typically constructed from stainless wire mesh of a desired porosity to provide good filtration of air bubbles and solid particles when passing ink from the three sections 42, 44 and 46 of polyurethane foam located in the three compartments 12, 14 and 16 of the pen body 10.

The back surface 48 of the foam body sections 42, 44 and 46 is fitted with a plug generally designated as 50, and this plug including its end cover 51 prevents back-pressure build up and facilitates the removal of ink from the foam and through the filters 36, 38 and 40 to the printhead 28. Air vents 52 are covered with porous plastic membranes 54 which prevent ink from leaking out through the air vents 52. The remaining structural detail of these three vents 52 and their intermediate wall partitions 66 and 68 is shown in a larger cross-section view in FIG. 2 below. As previously indicated, the foam material of sections 42, 44 and 46 is a controlled porosity ether-type polyurethane foam which has been reticulated to break the membrane walls therein. This increases the capillary force of the foam and thereby renders it especially well suited for feeding ink along the ink feed paths to a thin film resistor thermal ink jet printhead. The plug 50 further includes foam compression tabs 56 which extend into the foam sections 42, 44 and 46 as shown and provide a desired amount of compressive forces to the foam for further increasing capillary forces in the foam and optimizing ink dispensation to the printhead.

The particular foam which has been used in actual practice is an ether-type foam material obtained from the Scott Paper Company of Philadelphia, Pa. and had a porosity of between 60 and 75 pores per inch.

Figure 2:
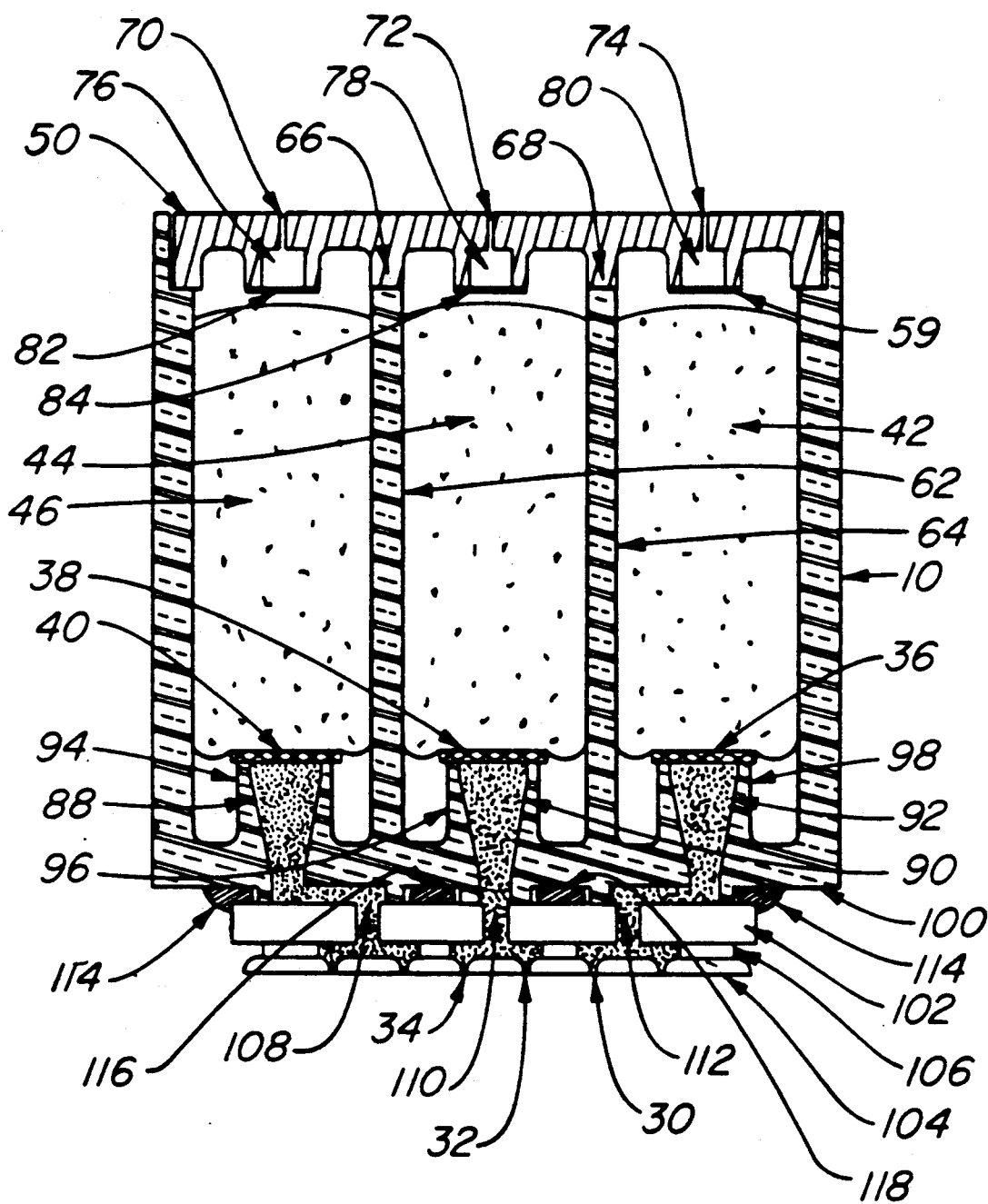
FIG. 2 is a cross section view taken along lines 2—2 of FIG. 1.

Referring now to FIG. 2, the cross section view in this figure is taken along lines 2—2 of FIG. 1 wherein like reference numerals have been used in both figures to identify the same components therein. The pen body 10 includes interior walls 62 and 64 which serve to partially define the three compartments for receiving the rectangular sections 42, 44 and 46 of foam as shown in FIG. 1. These interior walls 62 and 64 receive the corresponding T-shaped interior extensions 66 and 68 of the cover or end member 51 of the previously described end plug 50. This plug 50 further includes air vents 70, 72 and 74 which communicate with the cavities or recessed portions 76, 78 and 80 as shown. These recessed portions or cavities 76, 78 and 80 in the cover member 51 of the plug 50 receive a plurality of porous membranes 82, 84 and 54 which are fabricated from polytetraflouroethylene (PTFE) and which provide adequate ventilation within the three compartments of foam. At the same time, these membranes 82, 82 and 54 are of sufficient mesh density to prevent ink back-flow through the three air vents 70, 72 and 74.

A plurality of ink chambers 88, 90 and 92 are provided as shown in the three ink pipes 94, 96 and 98, respectively, in the lower regions of the pen body 10. Each of these ink pipes 94, 96 and 98 are provided, respectively, with the three previously identified wire mesh filters 40, 38 and 36. These latter filters provide filtering of air bubbles and solid particles from the ink which ultimately passes through the ink pipes 88, 90 and 92 and to the TFR printhead 28. This ink flow path also includes the lateral ink passage located between the lower surface 100 of the pen body 10 and the facing surface of the semiconductor substrate member 102 of the TFR printhead substrate 28.

The geometrical configuration of the ink pipes 94, 96 and 98 in combination with the walls 62, 64 and 66 and the spacing therebetween beneath the foam increases the compression of the foam in the areas above the three filters. This fact in turn increases the capillarity of the foam in the region thereof above these three filters and thus reduces the possibility of air bubbles interrupting the ink path vertically down through the foam and into the three ink pipes 94, 96 and 98.

The substrate member 102 is bonded to a nozzle plate 104 by means of an adhesive barrier 106. This barrier 106 may advantageously be a selected polymer material such as the RISTON or VACREL trade name polymer materials made available by the E. I. Dupont Company of Wilmington, Del. The ink will flow vertically down through the ink pipes 88, 90 and 92 and then into the three vertical passages 108, 110 and 112 in the substrate member 102. These vertical passageways 108, 110 and 112 will then feed ink to the plurality of groups of orifices 30, 32 and 34 in the nozzle plate 104 and located in a circular pattern as shown.

The nozzle plate 104 may advantageously be electroformed of nickel and plated with gold and then affixed to the polymer barrier material 106 using, for example, the heat staking process disclosed and claimed in copending application Ser. No. 861,192 of Stephen J. Nigro et al. This application is entitled "Process For Manufacturing Thermal Ink Jet Printheads and Structures Produced Thereby", and is assigned to the present assignee and incorporated herein by reference. The nozzle plate 104 may be fabricated in the manner described in the above identified *Hewlett Packard Journal*, Vol. 38, No. 5 May 1985.

Finally, the thin film resistor structure 28 is secured to the bottom facing surface 100 of the pen body 10 by means of a suitable adhesive 114 which is disposed as shown at the outer periphery of the substrate 102, as well as at interior recessed wall surfaces 116 and 118 thereof.

The present invention is not limited to thermal ink jet applications and may instead be used in other types of ink jet applications in which the above foam storage-of-ink capability is desirable and compatible.

INDUSTRIAL APPLICABILITY

The pen body according to this invention is useful in the manufacture of black and white and color printers and plotters operative in a variety of raster and vector modes.

We claim:
1. An ink jet pen including, in combination:
    a. a housing and support member having a support surface at one end thereof with openings for passing ink therethrough,
    b. a thin film resistor type thermal ink jet printhead mounted on said support surface and having a plurality of ink ejection orifices communicating with said openings in said support surface,
    c. a porous foam material mounted within said housing and said support member and operative to receive and retain a supply of ink for feeding ink through said openings in said support surface and to said ink jet printhead, with said printhead receiving ink directly from said openings in said support surface and operative to eject ink in a direction normal to said support surface, said foam material being compressible to reduce its thickness and pore size while increasing its density, and the desired capillarity of said foam may be controlled and the capillary force of the foam increased to thereby render said foam material especially well suited for feeding ink to a thin film resistor type of thermal ink jet printhead, and
    d. tab means extending into contact with said foam material for providing a desired amount of compressive force to said foam.
2. A printhead and orifice plate assembly which comprises:
    a. a thin film resistor type of thermal ink jet substrate member having a plurality of openings therein for receiving different colors of ink, b. a barrier layer mounted on said substrate member and having a geometry defining a plurality of ink reservoirs which receive ink from said openings, c. a nozzle plate disposed on said barrier layer and having a plurality of ink ejection orifices which receive different colors of ink from said reservoirs, whereby multiple colors of ink may be ejected from a single plane in which said orifices lie, d. a multi-compartment housing adjacent to and supporting said substrate member, e. ink storage means within each compartment of said housing for supplying ink to said substrate member and directly through openings in said housing, said ink storage means being a foam material compressible to reduce the pore size therein and increase its density, so that the desired capillarity of said foam material can be controlled and the capillary force of said foam increased, thereby rendering said foam material especially well suited for feeding ink to a thin film resistor type of thermal ink jet printhead, and d. tab means extending into contact with said foam material for providing a desired amount of compressive force to said foam.

3. The assembly defined in claim 2 wherein said substrate member has fluidically isolated passages therein for receiving ink, respectively, from different compartments in said multicompartment housing adjacent to and supporting said substrate, said nozzle plate having a plurality of orifice groups coupled, respectively, to each of said fluidically isolated passages and all symmetrically arranged with respect to each of said passages feeding ink thereto, whereby said isolated passages may be connected to receive cyan, magenta, and yellow colors of ink.

* * * * *

UNITED STATES PATENT AND TRADEMARK OFFICE
CERTIFICATE OF CORRECTION

PATENT NO. : 5,025,271

DATED : June 18, 1991

INVENTOR(S) : Jeffrey P. Baker, Duong T. La, Randy A. Coverstone

It is certified that error appears in the above-identified patent and that said Letters Patent is hereby corrected as shown below:

The term of this patent subsequent to September 13, 2005, has been disclaimed.

Signed and Sealed this

Nineteenth Day of November, 1991

Attest:

HARRY F. MANBECK, JR.

*Attesting Officer*     *Commissioner of Patents and Trademarks*